United States Patent
Diessner et al.

(10) Patent No.: US 12,344,166 B2
(45) Date of Patent: Jul. 1, 2025

(54) TOW BALL POSITION DETECTION SYSTEM

(71) Applicant: Continental Autonomous Mobility US, LLC, Auburn Hills, MI (US)

(72) Inventors: Horst Daniel Diessner, Rochester Hills, MI (US); Nizar Ahamed, Farmington Hills, MI (US); Akash Maheshwari, Ferndale, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 94 days.

(21) Appl. No.: 18/044,140

(22) PCT Filed: Sep. 9, 2021

(86) PCT No.: PCT/US2021/071401
§ 371 (c)(1),
(2) Date: Mar. 6, 2023

(87) PCT Pub. No.: WO2022/056532
PCT Pub. Date: Mar. 17, 2022

(65) Prior Publication Data
US 2023/0331160 A1 Oct. 19, 2023

Related U.S. Application Data

(60) Provisional application No. 63/077,261, filed on Sep. 11, 2020.

(51) Int. Cl.
*B60R 1/26* (2022.01)
*B60D 1/36* (2006.01)

(52) U.S. Cl.
CPC ............... *B60R 1/26* (2022.01); *B60D 1/36* (2013.01); *B60R 2300/30* (2013.01); *B60R 2300/808* (2013.01)

(58) Field of Classification Search
CPC . B60R 1/26; B60R 2300/30; B60R 2300/808; B60D 1/36; B60D 1/62
See application file for complete search history.

(56) References Cited

U.S. PATENT DOCUMENTS

| 10,744,943 | B1 | 8/2020 | Jales Costa | |
| 2018/0081370 | A1* | 3/2018 | Miller | B60W 10/04 |

(Continued)

FOREIGN PATENT DOCUMENTS

| JP | 2017076833 A | 4/2017 |
| WO | 2016164118 A2 | 10/2016 |

OTHER PUBLICATIONS

The International Search Report and the Written Opinion of the International Searching Authority mailed on Dec. 22, 2021 for the counterpart PCT Application No. PCT/US2021/071401.

(Continued)

*Primary Examiner* — Fernando Alcon

(57) ABSTRACT

A method and system are disclosed for performing a trailer operation for a vehicle having a tow ball. The method includes receiving a first image from a rear camera disposed along a rear portion of the vehicle in a first position; and detecting a pixel position of a representation of the tow ball in the first image. Following the rear camera being moved from the first position to a second position along the rear portion of the vehicle, the method includes receiving a second image from the rear camera. The method also includes detecting a second pixel position of a representation of the tow ball in the second image; and estimating a position of the tow ball relative to the vehicle based on the first and second positions of the rear camera and the detected pixel positions of the representations of the tow ball in the first and second images.

17 Claims, 9 Drawing Sheets

(56) References Cited

U.S. PATENT DOCUMENTS

| | | | | |
|---|---|---|---|---|
| 2018/0181142 A1* | 6/2018 | Baran | ................. | B60D 1/36 |
| 2018/0361929 A1* | 12/2018 | Zhang | ................. | B60D 1/366 |
| 2019/0092109 A1* | 3/2019 | Carpenter | ................. | B60D 1/62 |
| 2019/0176699 A1 | 6/2019 | Naserian | | |
| 2019/0339708 A1 | 11/2019 | Ramirez Llanos | | |
| 2020/0175707 A1* | 6/2020 | Diessner | ................. | B60R 1/26 |
| 2020/0334475 A1* | 10/2020 | Joseph | ................. | B62D 15/027 |
| 2021/0023997 A1* | 1/2021 | Vasoya | ................. | B60D 1/245 |
| 2021/0070357 A1* | 3/2021 | Niewiadomski | ................. | B60W 10/20 |
| 2021/0094615 A1* | 4/2021 | Niewiadomski | ................. | B62D 13/00 |
| 2022/0024391 A1* | 1/2022 | Gali | ................. | G06T 7/73 |
| 2022/0180557 A1* | 6/2022 | Ramirez Llanos | ................. | G06T 7/74 |
| 2024/0336200 A1* | 10/2024 | Baur | ................. | B60R 1/26 |

OTHER PUBLICATIONS

Notice of Reasons for Refusal drafted Mar. 12, 2024 for the counterpart Japanese Patent Application No. 2023-516135 and machine translation of same.

Decision to Grant a Patent drafted Jun. 20, 2024 for the counterpart Japanese Patent Application No. 2023-516135 and machine translation of same.

* cited by examiner

TOW BALL POSITION DETECTION SYSTEM

CROSS REFERENCE TO RELATED APPLICATION

The present application is a National Stage Application under 35 U.S.C. § 371 of International Patent Application PCT/US2021/071401 filed on Sep. 9, 2021 which claims priority from U.S. provisional patent application No. 63/077,261, filed Sep. 11, 2020, the disclosures of which are incorporated by reference herein in their entireties.

TECHNICAL FIELD

This disclosure relates to a tow ball position detection system of a tow ball supported by a tow vehicle.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack.

The position of a tow ball (also referred to as hitch ball) is important for several automated trailer assist functions, and accurate knowledge of the tow ball position is the enabler for such functions.

For instance, a trailer hitch assist system uses the information of the tow ball position along with the coupler position to control the vehicle to a suitable hitching position. However, there is no standard size for the tow ball, or the mount used to attach the tow ball to the hitch on the vehicle. Moreover, the tow ball height is also often adjustable. As a result, there is a need for an accurate tow ball position estimation feature for a tow vehicle.

SUMMARY

Example embodiments are directed to a method and system for performing a trailer operation for a vehicle having a tow ball mounted thereto. The method includes receiving, by data processing hardware, a first image from a rear camera disposed along a rear portion of the vehicle in a first position. A pixel position of a representation of the tow ball in the first image is detected by the data processing hardware. Following the rear camera being moved from the first position to a second position along the rear portion of the vehicle, the method includes receiving, by the data processing hardware, a second image from the rear camera, and detecting, by the data processing hardware, a second pixel position of a representation of the tow ball in the second image. The data processing hardware estimates a position of the tow ball relative to the vehicle based on the first and second positions of the rear camera and the detected pixel positions of the representations of the tow ball in the first and second images.

The method may also determine, by the data processing hardware, a change in position of the rear camera in world coordinates between the first position and the second position, wherein the position of the tow ball is estimated based upon the change in position of the rear camera. The change in position of the rear camera may be based in part on a change in angular position, relative to the vehicle, of a tailgate, a liftgate or a trunk of the vehicle to which the rear camera is mounted.

The method may further include, after receiving the first image, sending, by the data processing hardware, an instruction to move the tailgate, liftgate or trunk of the tow vehicle to which the rear camera is mounted from a first component position, corresponding to the first position of the rear camera, to a second component position corresponding to the second position of the rear camera. The instruction to move the tailgate, liftgate or trunk of the tow vehicle may be sent to one of a display to prompt a tow vehicle user to manually move the tailgate, liftgate or trunk, or a component positioning system to move the tailgate, liftgate or trunk without user intervention.

The method may further include determining, by the data processing hardware, a change in pixel coordinates between the pixel position of the tow ball representation in the first image and the pixel position of the tow ball representation in the second image, wherein the position of the tow ball is estimated based upon the change in pixel coordinates.

The method may also include, before receiving the first image, sending an instruction to move the tailgate, liftgate or trunk to which the rear camera is mounted to a first component position, corresponding to the first position of the rear camera.

In one aspect, the method includes receiving a third image from the rear camera while in the first position or the second position, identifying a representation of the tow ball in the third image, and determining a pixel position of the representation of the tow ball in the third image. The method may compare or correlate the determined pixel position of the representation of the tow ball in the third image with the estimated position of the tow ball. Based upon the comparing or correlating, the method determines whether to use the estimated tow ball position in trailer assist functions.

The method may include receiving a third image from the rear camera while in the first position or the second position. Based upon the third image and the rear camera being in the first or second position, the method may determine that a tow ball representation is not in the third image. The method send an instruction to one or more vehicle systems of the vehicle to temporarily disable trailer assist operations.

In some aspects, the second position is a predetermined position having known position coordinates or is a position from which position coordinates are determined.

In an example embodiment, a system for performing a trailer operation for a vehicle having a tow ball mounted thereto includes data processing hardware; and non-transitory memory hardware in communication with the data processing hardware. The memory hardware stores instructions that when executed on the data processing hardware cause the data processing hardware to perform a method as described hereinabove.

DESCRIPTION OF DRAWINGS

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It may be difficult to driver the vehicle-trailer system in a rearward direction.

Figure 1:
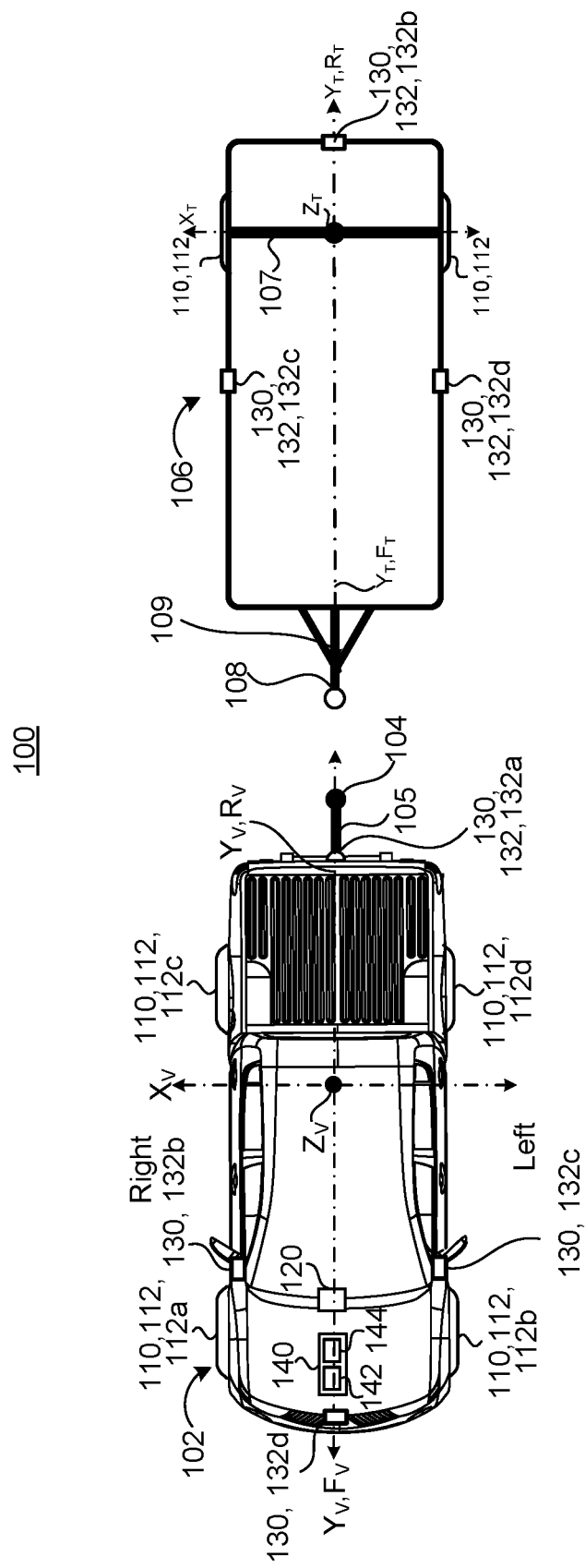
FIG. 1 is a top view of an example tow vehicle with a trailer positioned behind the tow vehicle.
Figure 2:
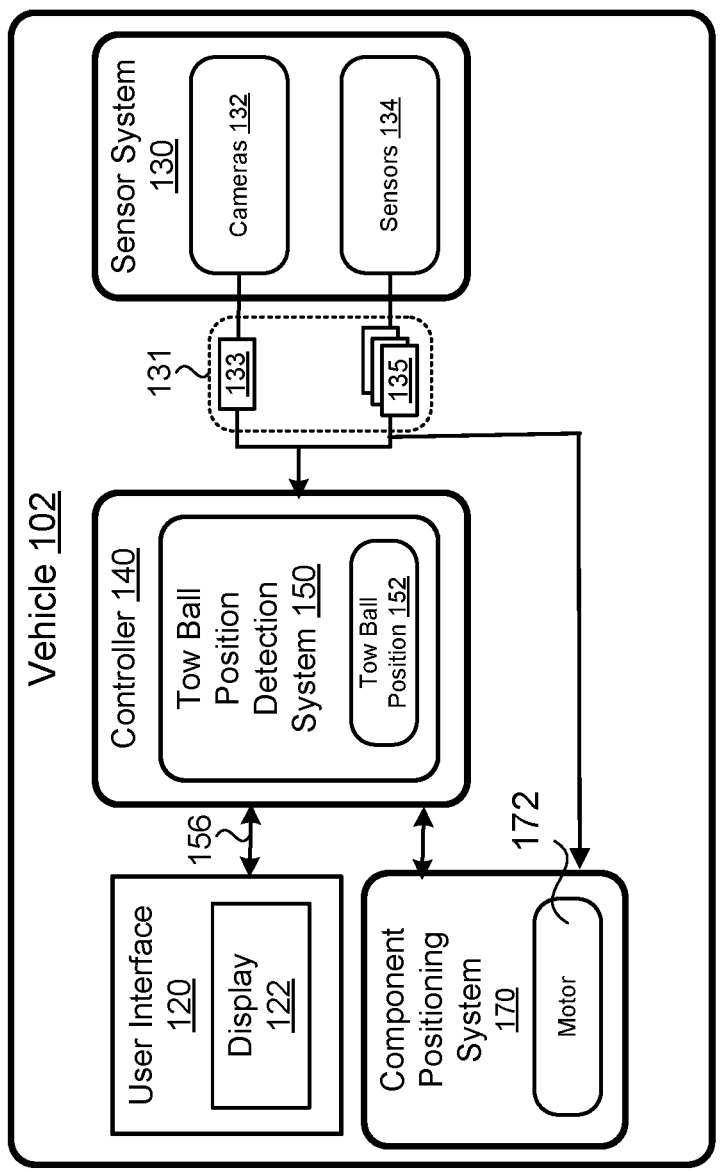
FIG. 2 is a schematic view of the example vehicle system of FIG. 1.

Referring to FIGS. 1 and 2, in some implementations, a vehicle-trailer system 100 includes a tow vehicle 102 capable of being attached to a trailer 106. The tow vehicle 102 includes a vehicle tow ball 104 (also referred to as hitch ball) supported by a vehicle hitch bar 105. The vehicle tow ball 104 may be coupled to the trailer 106 by way of a trailer hitch coupler 108 supported by a trailer hitch bar 109 of the trailer 106 when the vehicle and trailer are hitched. The tow vehicle 102 may include a drive system 110 that maneuvers the tow vehicle 102 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system (not shown) that includes brakes associated with each wheel 112, 112a-d, and an acceleration system (not shown) that is configured to adjust a speed and direction of the tow vehicle 102. In addition, the drive system 110 may include a suspension system (not shown) that includes tires associates with each wheel 112, 112a-d, tire air, springs, shock absorbers, and linkages that connect the tow vehicle 102 to its wheels 112, 112a-d and allows relative motion between the tow vehicle 102 and the wheels 112, 112a-d.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$ extends between a right-side and a left-side of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. In some examples, the tow vehicle 102 includes a suspension system (not shown), which when adjusted causes the tow vehicle 102 to tilt about the $X_V$ axis and/or the $Y_V$ axis or move along the central vertical axis $Z_V$.

The tow vehicle 102 may include a user interface 120. The user interface 120 may include a display 122, a knob, and a button, which are used as input mechanisms. In some examples, the display 122 may show the knob and the button, while in other examples, the knob and the button are a knob button combination. In some examples, the user interface 120 receives one or more driver commands from the driver via one or more input mechanisms or a touch screen display 122 and/or displays one or more notifications to the driver. The user interface 120 is in communication with a controller 140. In some examples, the display 122 displays an image 133 of an environment of the tow vehicle 102. The display 122 may be part of the tow vehicle 102 or separate therefrom, such as the display of a handheld electronic device.

The tow vehicle 102 may include a sensor system 130 to provide reliable and robust driving. The sensor system 130 may include different types of sensors that may be used separately or with one another to create a perception of the environment of the tow vehicle 102 and the trailer 106 that is used for the tow vehicle 102 to drive and aid the driver in make intelligent decisions based on objects and obstacles detected by the sensor system 130. The sensor system 130 may include the one or more cameras 132, 132a-d supported by the vehicle-trailer system 100. In some implementations, the tow vehicle 102 includes a rear vehicle camera 132a (i.e., a first camera) that is mounted to provide a view of a rear-driving path for the tow vehicle 102, or in other words, the rear vehicle camera 132a captures images 133 of a rear environment of the tow vehicle 102. The rear vehicle camera 132a may be positioned on the tailgate of the tow vehicle 102.

In some implementation, the rear vehicle camera 132a may include a fisheye lens having an ultra-wide-angle lens that produces strong visual distortion intended to create a wide panoramic or hemispherical image. Fisheye cameras capture images having an extremely wide angle of view. Moreover, images captured by the fisheye camera have a characteristic convex non-rectilinear appearance. Other types of cameras may also be used to capture the images 133.

The sensor system 130 may also include other sensors 134 that detect the vehicle motion, i.e., speed, angular speed, position, etc. The other sensors 134 may include an inertial measurement unit (IMU) configured to measure the vehicle's linear acceleration (using one or more accelerometers) and rotational rate (using one or more gyroscopes). In some examples, the IMU also determines a heading reference of the tow vehicle 102. Therefore, the IMU determines the pitch, roll, and yaw of the tow vehicle 102. The other sensors 134 may also include, but are not limited to, radar, sonar, LIDAR (Light Detection and Ranging, which can entail optical remote sensing that measures properties of scattered light to find range and/or other information of a distant target), LADAR (Laser Detection and Ranging), ultrasonic, HFL (High Resolution 3D Flash LIDAR), etc. In some implementations, the sensor system 130 may provide external sensor data received from other systems or vehicles, such as by way of V2X communication or any other communication. Still other sensors 130 may include at least one position sensor which senses the position of a movable component of the tow vehicle 102, as described in greater detail below.

In example embodiments, the rear camera 132a is mounted to a movable component of the tow vehicle 102. Such movable component of the tow vehicle 102 is movable relative to the rest of the tow vehicle. In one example, the tow vehicle 102 is a pickup truck, the movable component is the truck's tailgate 160 and the rear camera 132a is mounted along the tailgate. In another example, the tow vehicle 102 is a sedan, the movable component is the trunk and the rear camera 132a is mounted along the trunk. In yet another embodiment, the tow vehicle is a sport utility vehicle (SUV), the movable component is the liftgate of the SUV and the rear camera 132a is mounted along the liftgate. In every example, the movable component may be moved between at least two positions in which each position the rear camera 132a is capable of capturing an image having depicted therein the tow ball 104.

The controller 140 includes a computing device (or processor) 142 (e.g., central processing unit having one or more computing processors) in communication with non-transitory memory 144 (e.g., a hard disk, flash memory, random-access memory) capable of storing instructions executable on the computing processor(s) 142. The controller 140 may be supported by the tow vehicle 102, the trailer 106, or both the tow vehicle 102 and the trailer 106. In some examples, the controller 140 executes an tow ball position detection system 150 that provides the driver of the tow vehicle 102 with a panoramic view 152 of the environment behind the trailer 106.

In an example embodiment, the tow vehicle 102 includes a component positioning system 170 (FIG. 2) which is electronically coupled to the controller 140. Component positioning system 170 selectively positions the above-described movable vehicle component relative to the tow vehicle 102. In an embodiment in which the tow vehicle 102 is a pickup truck, the component positioning system 170 is operably associated with the tailgate 160 of the truck for opening and closing the tailgate. In an embodiment in which the tow vehicle 102 is a sedan, the component positioning system 170 is operably associated with the trunk of the sedan for opening and closing the trunk. In an embodiment in which the tow vehicle 102 is a SUV, the component positioning system 170 is operably associated with the liftgate of the SUV for opening and closing same. The component positioning system 170 may itself include a motor and controller (not shown) communicatively coupled thereto, for controlling or setting the open position of the movable vehicle component. The component positioning system 170 is communicatively coupled to the controller 140 so that the controller 140 may send instructions to the component positioning system 170 to selectively position the movable vehicle component. At least one sensor 134 may also form a position sensor which senses the position of the movable vehicle component (tailgate 160, trunk, liftgate, etc.) and provides sensed position data 135 to the controller 140 and/or the component positioning system 170.

Figure 3:
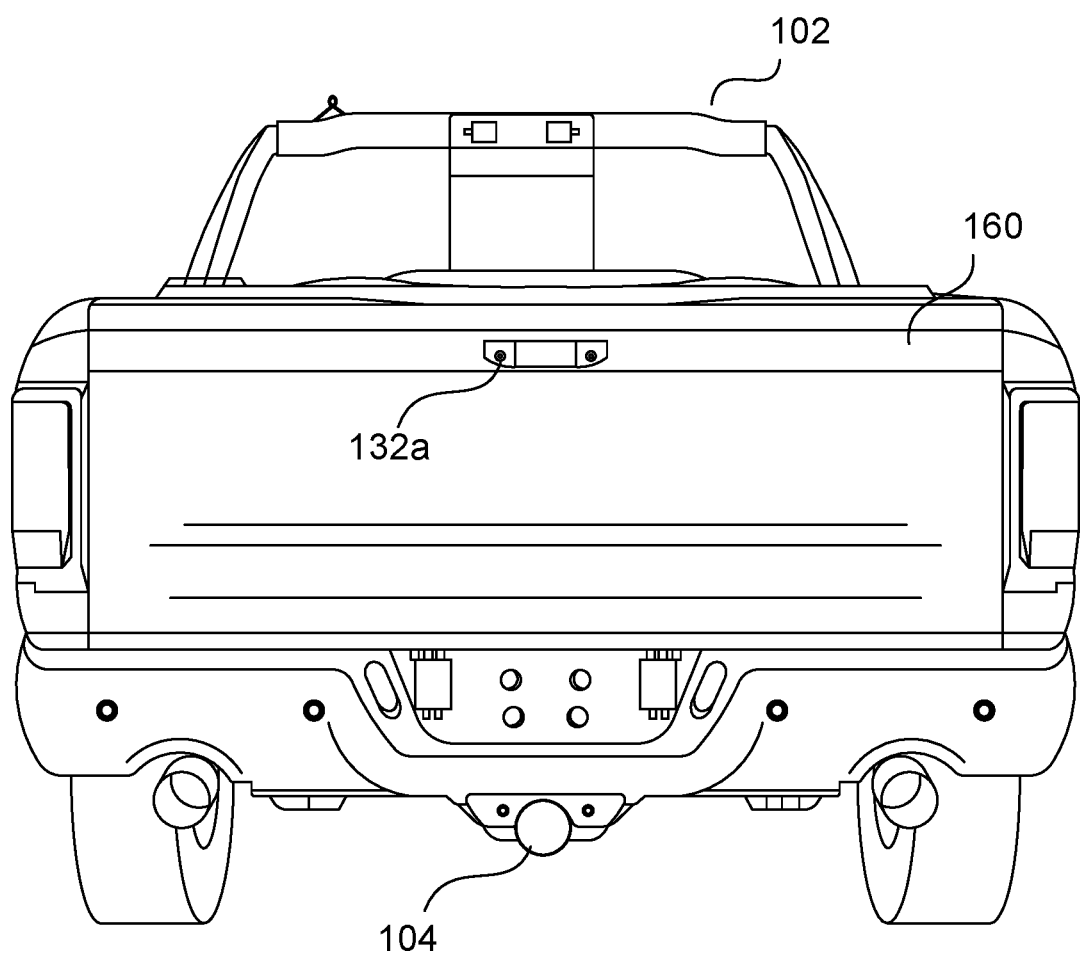
FIG. 3 is a view of a closed tailgate of the example tow vehicle shown in FIG. 1.
Figure 5:
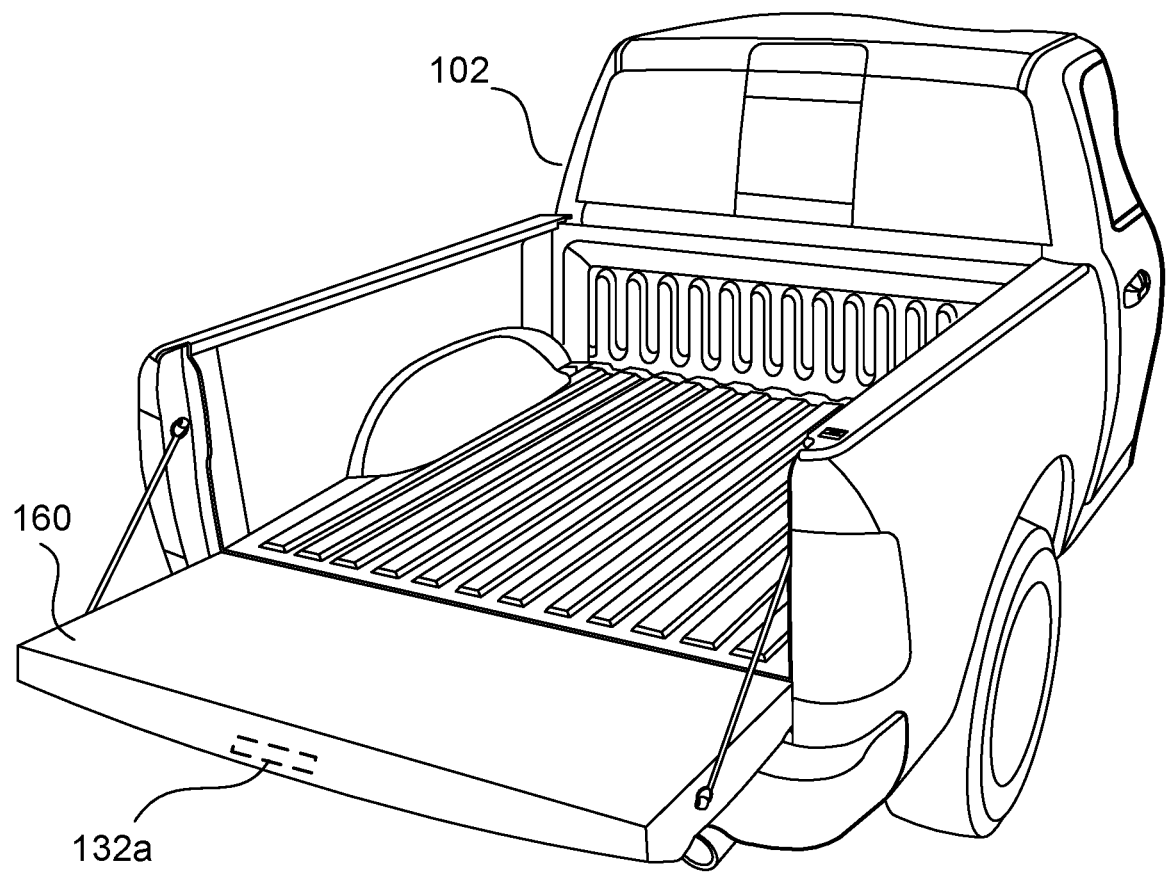
FIG. 5 is a perspective view of an open tailgate of the example tow vehicle shown in FIG. 1.

According to example embodiments, the tow vehicle 102 includes a tow ball position detection system 150 which estimates and/or determines the position of the tow ball 104. The system 150 detects, estimates or otherwise determines the position of the tow ball 104 as part of, for example, a calibration sequence. The calibration sequence may be performed, for example, during a power up sequence of operations of the tow vehicle 102 or at the onset of a trailer assist function or operation. Once detected, the location of the tow ball 104 may be used as part of a trailer assist function of the tow vehicle 102. The tow ball position detection system 150 may be used with the rear facing camera 132a which is mounted to a movable vehicle component that is movable between at least two positions, with each position capturing an image which includes a representation of the tow ball 104. The tow ball position detection system 150 will be described below for a tow vehicle 102 having a tailgate 160 for illustrative purposes, but it is understood that the tow ball position detection system 150 may be used for any other such movable vehicle portion to which the rear camera 132a is mounted. In an example embodiment, the tailgate 160 may be moved between a first, closed position as shown in FIG. 3 (i.e., a first component position) and a second, fully open position as shown in FIG. 5 (i.e., a second component position). In the example embodiment, the rear camera 132a is fixedly mounted along the top, center portion of the closed tailgate 160.

According to an example embodiment, the tow ball position detection system 150 estimates the position of the tow ball 104 using at least two images of the tow ball captured by the rear camera 132a, with each image captured by the rear camera 132a while in a different position relative to the tow vehicle 102. The tow ball estimation is based upon the change in position of the rear camera, in world coordinates, between a first image and a second image as well as a change in pixel position of a representation of the tow ball 104 in the first and second images. The position of the tow ball 104 as estimated in a calibration operation may then be used in a subsequent trailer assist operations.

Figure 8:
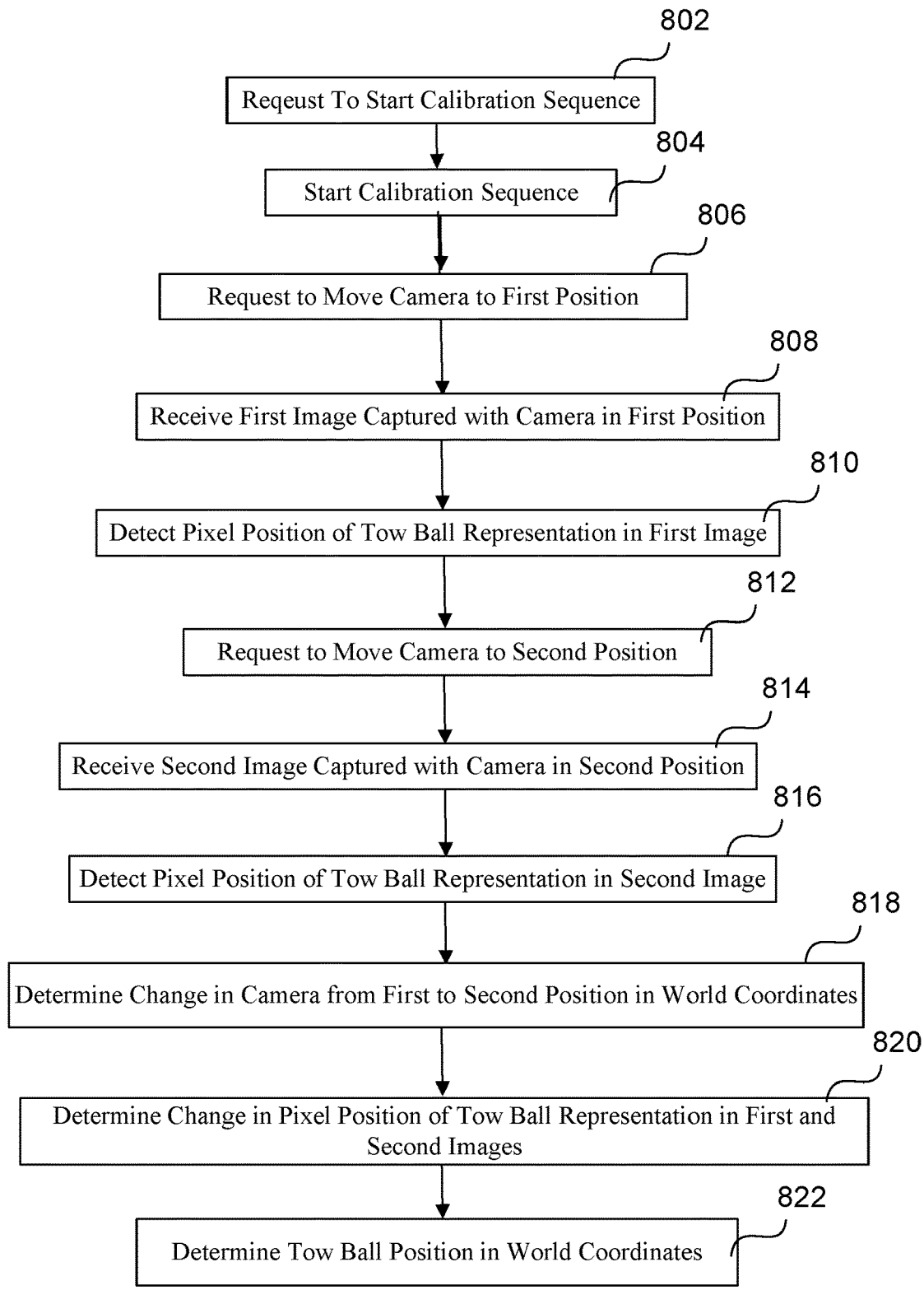
FIGS. 8 and 9 are flowcharts describing operations involving tow ball position estimations according to example embodiments.

FIG. 8 illustrates a method 800 for determining and/or estimating tow ball position according to at least one example embodiment. It is understood that the sequence of operations may occur in a different order that the order presented herein. Initially, a request is received at 802 to start a calibration operation. In some aspects, the request is received from the user of the tow vehicle 102 in response to a prompt provided by the processor 140 via the display 122. It is understood that the request may be received from other systems of the tow vehicle 102, such as a startup sequence at the time the tow vehicle is started or turned on. In response to the received request, the tow ball position detection system 150 begins the calibration sequence at 804.

In some example embodiments, the tow ball position detection system 150 begins the calibration by sending instructions at 806 to the tow vehicle user via the display 122 or to the component positioning system 170 to move the movable tow vehicle component to the first component position. Due to the rear camera 132a being mounted to the movable vehicle component, the movement of the movable tow vehicle component to the first component position corresponds to the rear camera 132a moving to a first position. For purposes of this description, the first component position is considered to be the closed position for the tailgate 160, trunk or liftgate, but it is understood that the first position may alternatively be an open position of the tailgate 160, trunk or liftgate.

In an alternative implementation, the tow ball position detection system 150 may detect the current position of the movable tow vehicle component, via a position sensor or using object recognition of a captured image, and only send the instructions in the event the movable tow vehicle component is in the open position (in this embodiment in which the closed position is considered the first component position). In still another alternative implementation, the tow ball position detection system 150 may detect the current position of the movable tow vehicle component and start the calibration with the movable tow vehicle component in the detected current position. In other words, the controller 140 assigns the detected current position as the first component position of the calibration operation.

Figure 4:
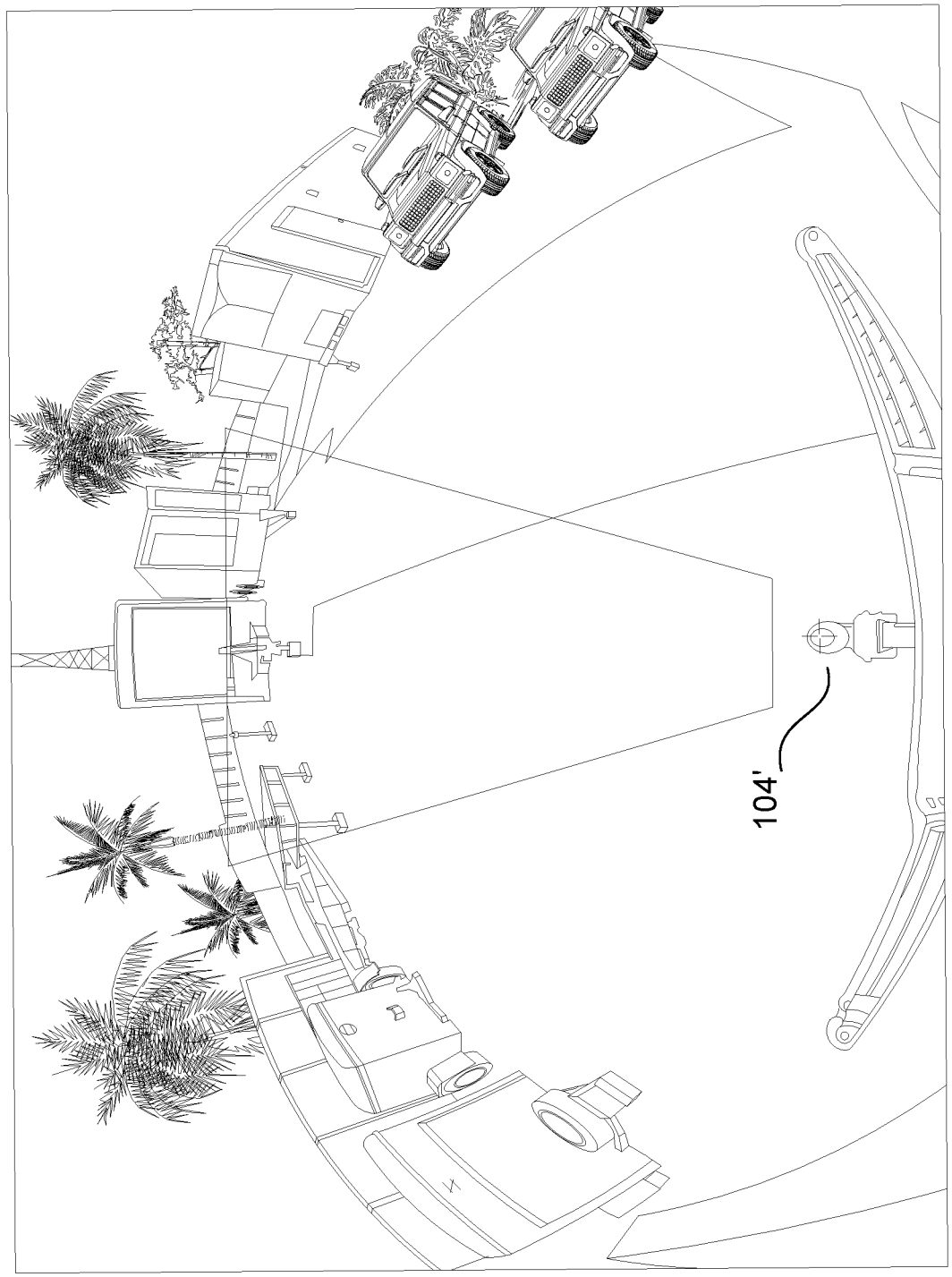
FIG. 4 is an image captured by a camera positioned on the tailgate of the tow vehicle shown in FIG. 3.

The controller 140 receives at 808 a first image of the rear environment of the tow vehicle 102 captured by the rear camera 132a while in the first position. The first image is depicted in FIG. 4, including a representation 104' of the tow ball 104. The pixel position of the representation 104' of the tow ball 104 in the first image is determined or otherwise detected at 810. The pixel position of the tow ball representation may be performed by one of any of a number of approaches. For example, the controller 140 may send instructions to the display 122 to display the first image and prompt the user of the tow vehicle 102 to select the tow ball representation by touching the portion of the touch screen display 122. With the tow ball representation selected by the tow vehicle user, controller 140 may detect the particular pixel position within the portion of the touch screen display 122 touched by the user. Alternatively, the tow ball position detection system 150 may automatically detect the tow ball representation in the first image using object recognition by computer vision, artificial intelligence and/or a neural network(s). One computer vision based approach for detecting the tow ball representation is a Hough transform for detecting circles in the image.

At 812, the controller 140 sends an instruction(s) so that the rear camera 132a is moved to a second position. In one embodiment, the instruction is sent to the display 122 to prompt the tow vehicle user to manually move the movable vehicle component to a second component position corresponding to the rear camera 132a being in the second position. In another embodiment, the instruction is sent to the component positioning system 170 to do the same. With the first component position being the tailgate 160 in the closed position, the second component position may be the tailgate 160 being in the fully open position. In an alternative implementation in which the calibration sequence is performed during operation of the tow vehicle 102, the tow ball position detection system 150 does not provide instructions for moving the movable vehicle component to a component position and instead waits for the movable vehicle component to be moved as initiated by the driver or other tow vehicle user. In this case, the calibration sequence does not continue until the movable vehicle component is moved. In this implementation, the calibration sequence is performed automatically without involving the driver or other tow vehicle user.

Figure 6:
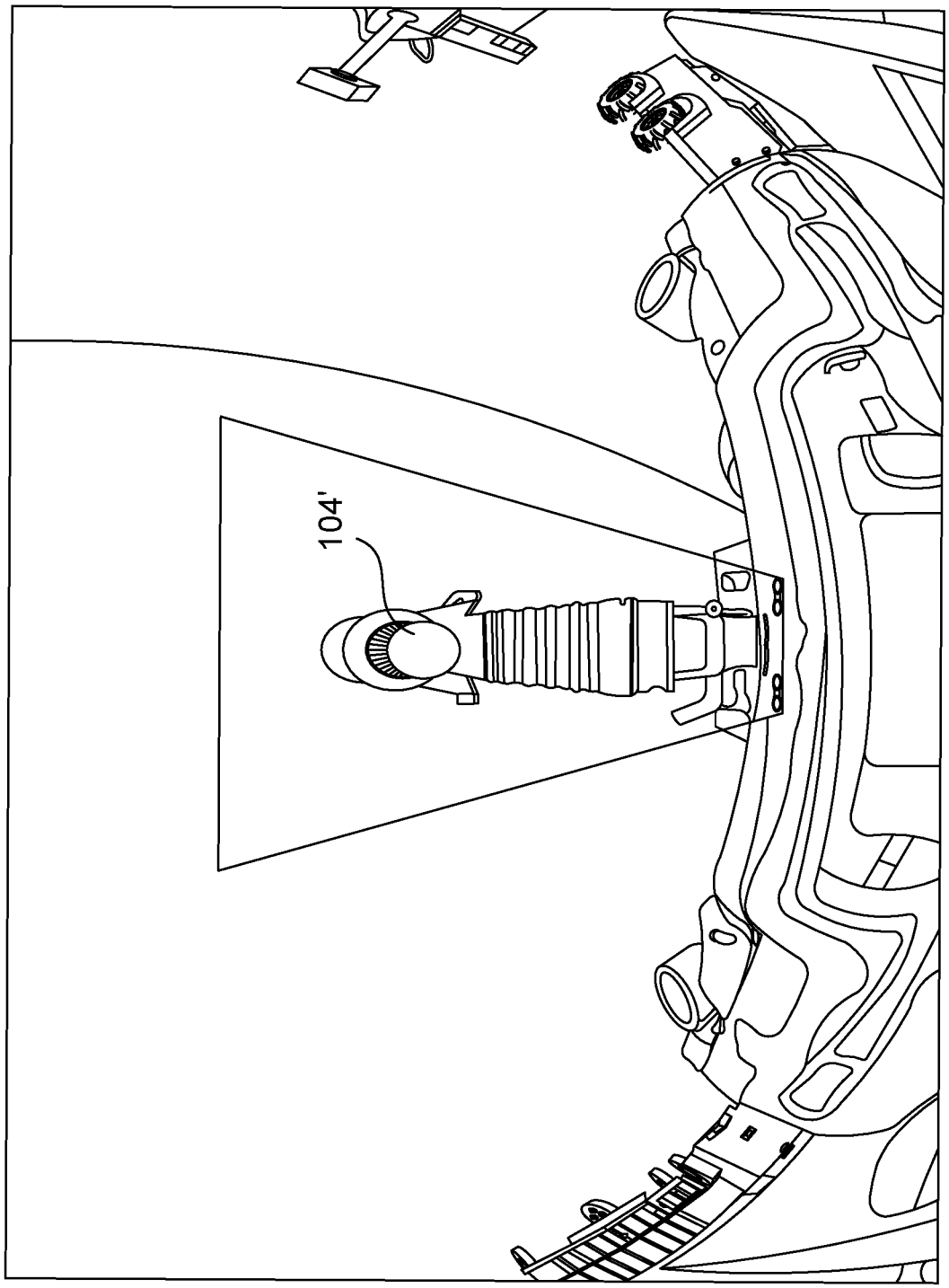
FIG. 6 is a perspective view of an image captured by the camera positioned on the tailgate of the tow vehicle shown in FIG. 5.

A second image is received by the controller 140 at 814 that is captured by the rear camera 132a while in the second position. The second image is shown in FIG. 6. The pixel position of the representation 104' of the tow ball 140 in the second image is detected at 816 using the approaches described above pertaining to block 810.

At 818, the tow ball position detection system 150 determines in world coordinates the change in position of the rear camera 132a from the first position to the second position. This determination may be based upon a known, fixed amount of change, such as a tailgate 160 having moved from the first component (closed) position to the second component (fully open) position. In addition or in the alternative, this determination may be based upon sensor data from a position sensor associated with the movable vehicle component to which the rear camera 132a is mounted. This change in the rear camera position, relative to the tow vehicle 102, due to the motion of the movable component results in a different viewing angle of the tow ball 104, thereby allowing tow ball position estimation using machine vision.

Figure 7:
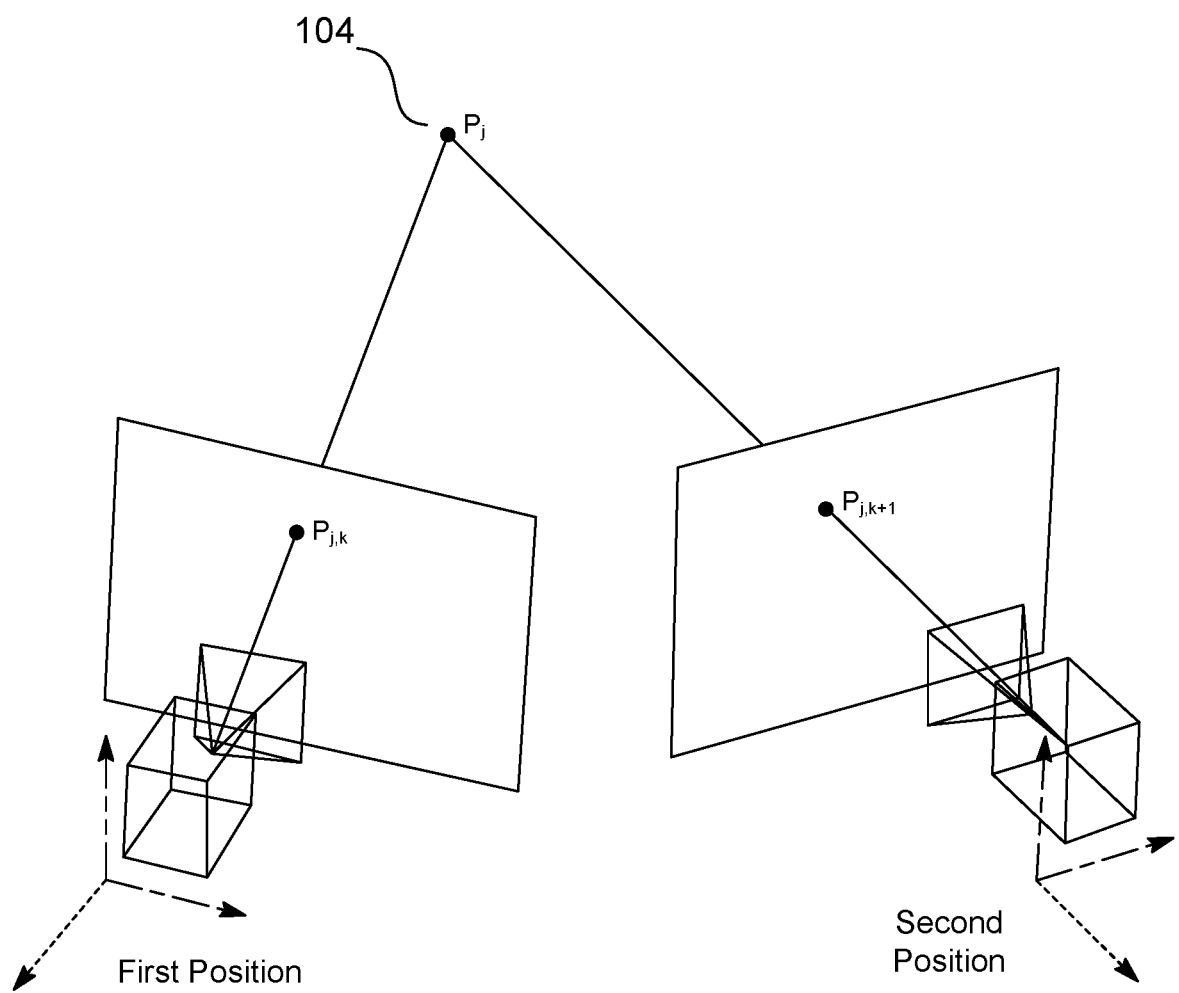
FIG. 7 is a schematic view of an example triangulation method to determine the tow ball position in world coordinates, the method shows how the change in camera position in real world can be combined with the change in the pixel position of a target in the image co-ordinates to find the target's position in the real world.

At 820, the tow ball position detection system 150 determines a change in pixel position of the representation 104' of the tow ball 104 in the first image and the representation 104' in the second image. Based upon the change in position of the rear camera 132a in world coordinates and upon the change in position of the representation 104' of the tow ball 104' in pixel coordinates, the tow ball position detection system 150 determines at 822 the position of the tow ball 104 in world coordinates. This determination may utilize triangulation or linear algebra to estimate the position of the tow ball 104. FIG. 7 illustrates triangulation in which the tow ball 104 is captured in two images and/or image planes by the rear camera 132a, each resulting in the tow ball representation 104' being in a different location in the image/image plane.

With the position of the tow ball 104 determined, the estimated tow ball position may be used by vehicle assist systems of the tow vehicle 102. In some embodiments, the calibration sequence for determining the tow ball position in world coordinates concludes at this point.

In some examples, the tow ball position detection system 150 records the tow ball position in the image at more than two different angles of the movable vehicle component (tailgate 16, trunk or liftgate) and uses this additional information to further estimate tow ball position with an increased accuracy.

Further, the tow ball position detection system 150 verifies that the position of the tow ball 104 as estimated and/or detected in a previous calibration operation remains valid for use in trailer assist operations or functions. Specifically, the system detects the tow ball representation 104' in an image recently captured by the rear camera 132a, compares the previously estimated position for the tow ball 104 to the representation 104' of the tow ball 104 in the image, and verifies that the tow ball representation 104' in the recently captured image is in an expected position in the image. This verification is helpful to confirm that the tow ball 104 and/or the hitch bar 105 that were subject to a prior calibration were not replaced since the last calibration was performed.

Figure 9:
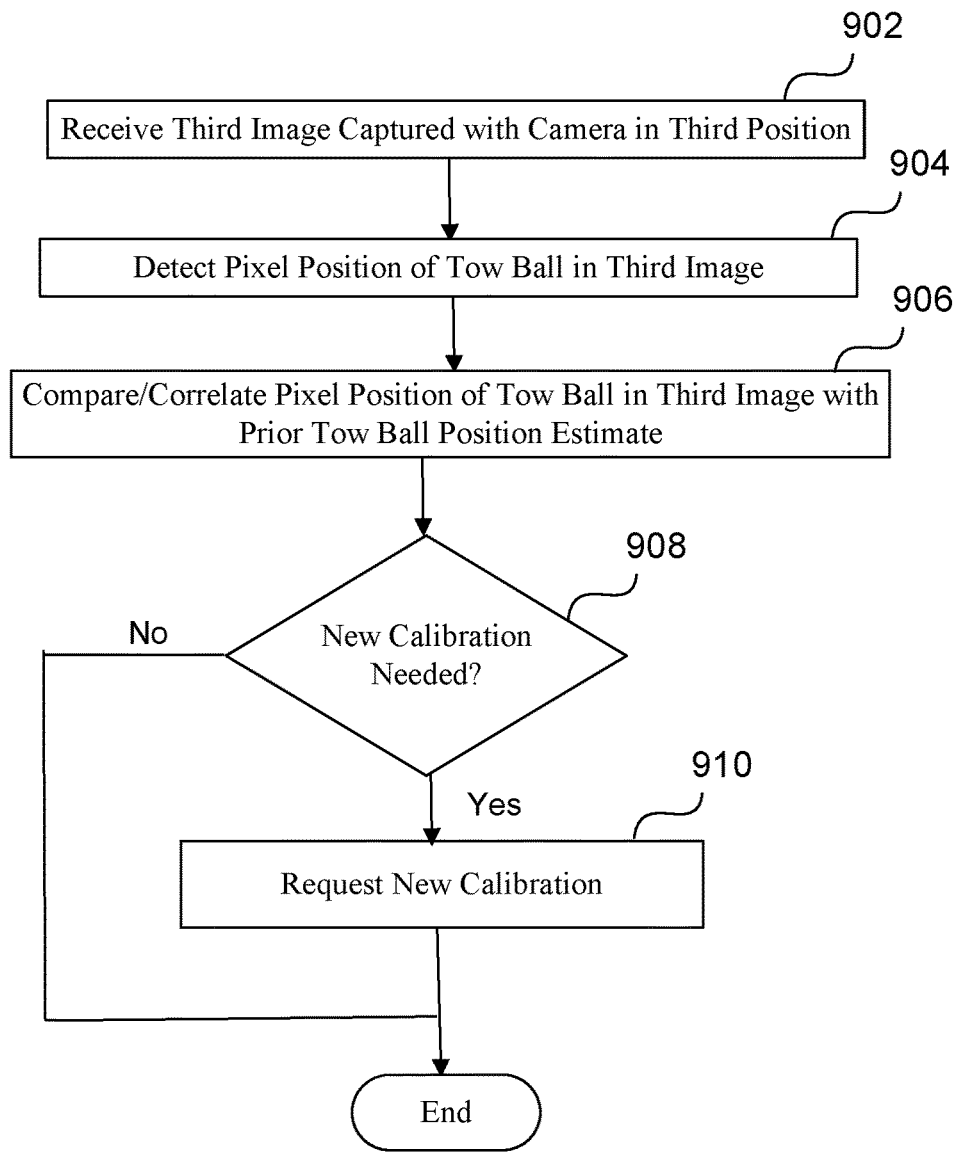

FIG. 9 illustrates a flowchart 900 describing the method for verifying a previous calibration sequence remains valid for use in trailer assist operations, according to an example embodiment. At 902, the controller 140 receives a third image recently captured by the rear camera 132a, with the rear camera being at a known position, such as with the tailgate 160 in the closed position or the open position. The pixel position of the representation 104' of the tow ball 104 is detected in 904. The position, in pixel coordinates, of the tow ball representation 104' may utilize any of the approaches described above with respect to block 810. The pixel location of the tow ball representation 104' in the third image is processed and correlated at 906 to the estimate of the position of the tow ball 104 from the prior calibration sequence. If the correlation is not achieved or otherwise indicates at 908 that the tow ball representation 104' in the recent image does not correspond to the previously estimated position of the tow ball 104, thereby suggesting that a different tow ball is now being used, the tow ball position detection system 150 requests at 910 that a new calibration sequence be performed or sends an instruction to the display 122 to prompt the tow vehicle user to request recalibration.

In blocks any of blocks 810 and 816 of FIG. 8 or block 904 of FIG. 9, if the tow ball position detection system 150 cannot identify the tow ball representation 104' in the corresponding camera image, the tow ball position detection system 150 assumes that no tow ball is attached to the tow vehicle 102. This information may be used to inhibit the activation of certain trailer assist functions such as the trailer hitch assist function.

The current invention automates the calibration process and eliminates or otherwise reduces the chance for human error.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for performing a trailer operation for a vehicle having a tow ball mounted thereto, the method comprising:
    receiving, by data processing hardware, a first image from a rear camera disposed along a rear portion of the vehicle in a first position;
    detecting, by the data processing hardware, a pixel position of a representation of the tow ball in the first image;
    following the rear camera being moved, relative to the vehicle, from the first position to a second position along the rear portion of the vehicle, receiving, by the data processing hardware, a second image from the rear camera;
    detecting, by the data processing hardware, a second pixel position of a representation of the tow ball in the second image; and
    estimating, by the data processing hardware, a position of the tow ball relative to the vehicle based on the first and second positions of the rear camera and the detected pixel positions of the representations of the tow ball in the first and second images.

2. The method of claim 1, further comprising determining, by the data processing hardware, a change in position of the rear camera in world coordinates between the first position and the second position, wherein the position of the tow ball is estimated based upon the change in position of the rear camera.

3. The method of claim 2, wherein determining the change in position of the rear camera is based in part on a change in angular position, relative to the vehicle, of a tailgate, a liftgate or a trunk of the vehicle to which the rear camera is mounted.

4. The method of claim 1, further comprising after receiving the first image, sending, by the data processing hardware, an instruction to move a tailgate, liftgate or trunk of the tow vehicle to which the rear camera is mounted from a first component position, corresponding to the first position of the rear camera, to a second component position corresponding to the second position of the rear camera.

5. The method of claim 4, wherein the instruction to move the tailgate, liftgate or trunk of the tow vehicle is sent to one of
    a display to prompt a tow vehicle user to manually move the tailgate, liftgate or trunk, or
    a component positioning system to move the tailgate, liftgate or trunk without user intervention.

6. The method of claim 1, further comprising determining, by the data processing hardware, a change in pixel coordinates between the pixel position of the tow ball representation in the first image and the pixel position of the tow ball representation in the second image, wherein the position of the tow ball is estimated based upon the change in pixel coordinates.

7. The method of claim 1, further comprising before receiving the first image, sending an instruction to move a tailgate, liftgate or trunk to which the rear camera is mounted to a first component position, corresponding to the first position of the rear camera.

8. The method of claim 1, further comprising:
receiving a third image from the rear camera while in the first position or the second position;
identifying a representation of the tow ball in the third image;
determining a pixel position of the representation of the tow ball in the third image;
comparing or correlating the determined pixel position of the representation of the tow ball in the third image with the estimated position of the tow ball; and
based upon the comparing or correlating, determining whether to use the estimated tow ball position in trailer assist functions.

9. The method of claim 1, further comprising:
receiving a third image from the rear camera while in the first position or the second position;
based upon the third image and the rear camera being in the first or second position, determining that a tow ball representation is not in the third image; and
responsive to determining that the tow ball representation is not in the third image, sending an instruction to one or more vehicle systems of the vehicle to temporarily disable trailer assist operations.

10. The method of claim 1, wherein the second position is a predetermined position having known position coordinates or is a position from which position coordinates are determined.

11. A system for performing a trailer operation for a vehicle having a tow ball mounted thereto, the system comprising:
data processing hardware; and
non-transitory memory hardware in communication with the data processing hardware, the memory hardware storing instructions that when executed on the data processing hardware cause the data processing hardware to perform a method comprising:
receiving a first image from a rear camera disposed along a rear portion of the vehicle in a first position;
detecting a pixel position of a representation of the tow ball in the first image;
following the rear camera being moved, relative to the vehicle, from the first position to a second position along the rear portion of the vehicle, receiving a second image from the rear camera;
detecting a second pixel position of a representation of the tow ball in the second image; and
estimating a position of the tow ball relative to the vehicle based on the first and second positions of the rear camera and the detected pixel positions of the representations of the tow ball in the first and second images.

12. The system of claim 11, wherein the method performed by the data processing hardware further comprises determining a change in position of the rear camera relative to the vehicle based on a change in angular position of a tailgate, a liftgate or a trunk of the vehicle to which the rear camera is mounted, wherein the position of the tow ball is estimated based upon the change in position of the rear camera.

13. The system of claim 11, wherein the method performed by the data processing hardware further comprises:
before receiving the first image, receiving an instruction from a user of the vehicle to begin a calibration sequence; and
after receiving the first image, sending an instruction to an interface of the vehicle to instruct the user of the vehicle to move a movable component of the tow vehicle to which the rear camera is mounted a first component position corresponding to the first position to a second component position corresponding to the second position.

14. The system of claim 11, wherein the method performed by the data processing hardware further comprises:
receiving a third image from the rear camera while in the first position or the second position;
identifying a representation of the tow ball in the third image;
determining a pixel position of the representation of the tow ball in the third image; and
comparing or correlating the determined pixel position of the representation of the tow ball in the third image with the estimated position of the tow ball; and
based upon the comparing or correlating, determining whether to use the estimated tow ball position in trailer assist operations.

15. The system of claim 11, wherein the method performed by the data processing hardware further comprises:
receiving a third image from the rear camera while in the first position or the second position;
based upon the third image and the rear camera being in the first or second position, determining that a tow ball representation is not in the third image; and
responsive to determining that the tow ball representation is not in the third image, sending an instruction to one or more vehicle systems of the vehicle to temporarily disable trailer assist operations.

16. The system of claim 11, wherein the method performed by the data processing hardware further comprises determining a change in pixel coordinates between the first pixel position of the tow ball representation in the first image and the second pixel position of the tow ball representation in the second image, wherein the position of the tow ball is estimated based upon the change between the first and second pixel positions of the tow ball representation.

17. The system of claim 11, wherein the second position is a predetermined position having known position coordinates or is a position from which position coordinates are determined by the data processing hardware.

* * * * *